United States Patent
Misawa

(10) Patent No.: US 9,866,041 B2
(45) Date of Patent: Jan. 9, 2018

(54) ELECTRIC POWER TRANSMISSION DEVICE

(71) Applicant: TOYOTA JIDOSHA KABUSHIKI KAISHA, Toyota-shi, Aichi-ken (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 14/947,180

(22) Filed: Nov. 20, 2015

(65) Prior Publication Data

US 2016/0156198 A1 Jun. 2, 2016

(30) Foreign Application Priority Data

Nov. 28, 2014 (JP) .................................. 2014-242084
Jan. 21, 2015 (JP) .................................. 2015-009581

(51) Int. Cl.
*H02J 5/00* (2016.01)
*H02J 50/12* (2016.01)
*B60L 11/18* (2006.01)

(52) U.S. Cl.
CPC .............. *H02J 5/005* (2013.01); *H02J 50/12* (2016.02); *B60L 11/182* (2013.01)

(58) Field of Classification Search
None
See application file for complete search history.

(56) References Cited

U.S. PATENT DOCUMENTS

| 2011/0127846 | A1 | 6/2011 | Urano | |
|---|---|---|---|---|
| 2011/0157928 | A1* | 6/2011 | Ku | H02J 3/383 363/37 |
| 2011/0260548 | A1 | 10/2011 | Urano | |
| 2014/0327397 | A1 | 11/2014 | Houivet et al. | |
| 2016/0268966 | A1* | 9/2016 | Jang | H02J 3/385 |

FOREIGN PATENT DOCUMENTS

| CN | 102969776 A | 3/2013 |
|---|---|---|
| JP | H10-225129 A | 8/1998 |
| JP | 2010-166693 A | 7/2010 |
| JP | 2012060850 A | 3/2012 |
| JP | 2014103754 A | 6/2014 |
| JP | 2014-207796 A | 10/2014 |
| JP | 5672843 B2 | 2/2015 |

* cited by examiner

*Primary Examiner* — Jared Fureman
*Assistant Examiner* — Aqeel Bukhari
(74) *Attorney, Agent, or Firm* — Oliff PLC

(57) ABSTRACT

An electric power transmission device contactlessly transmits electric power to an electric power receiving device. The electric power transmission device includes an inverter, a power transmission unit and an electronic control unit. The electronic control unit is configured to determine whether a current phase of output current flowing from the inverter to the power transmission unit leads output voltage, and adjust a frequency of the AC power in a direction to reduce a lead angle of the current phase when leading of the current phase relative to the output voltage is detected.

10 Claims, 10 Drawing Sheets

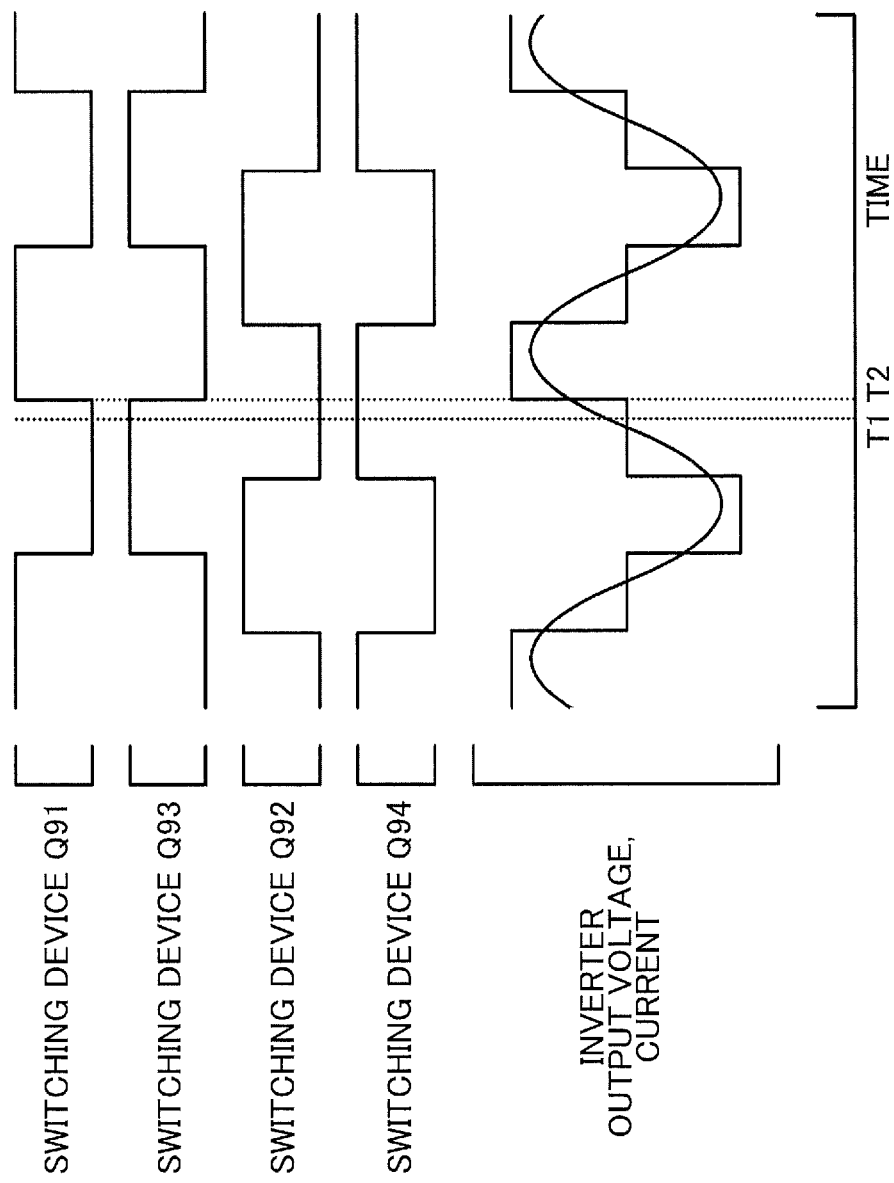

RECOVERY CURRENT

ELECTRIC POWER TRANSMISSION DEVICE

INCORPORATION BY REFERENCE

The disclosures of Japanese Patent Applications No. 2014-242084 and No. 2015-009581 filed on Nov. 28, 2014 and Jan. 21, 2015, each including the specification, drawings and abstract, are incorporated herein by reference in its entirety.

BACKGROUND OF THE INVENTION

1. Field of the Invention

The invention relates to an electric power transmission device, and in particular to an electric power transmission device that contactlessly or wirelessly transmits electric power to an electric power receiving device.

2. Description of Related Art

In a system of contactlessly or wirelessly transmitting electric power from an electric power transmission device to an electric power receiving device, it has been proposed, as a known technology of this type, to control the power-supply frequency of the electric power transmission device based on normalized power-transmission current (see, for example, Japanese Patent Application Publication No. 2014-103754 (JP 2014-103754 A)). The normalized power-transmission current is defined as the ratio of second power-transmission current to the maximum value of first power-transmission current. The first power-transmission current is defined as power-transmission current of the electric power transmission device measured when the electric power transmission device and the electric power receiving device are in a non-coupled state, and the second power-transmission current is defined as power-transmission current of the electric power transmission device measured when the electric power transmission device and the electric power receiving device are in an induction-coupled state. When the normalized power-transmission current is equal to or greater than ½, the power-supply frequency is set to the resonance frequency. When the normalized power-transmission current is less than ½, the power-supply frequency is controlled to be varied so that the normalized power-transmission current becomes equal to ½. With the power-supply frequency thus controlled, it is possible to increase received electric power, and maximize the electric power efficiency, only through control of the power-supply frequency of the electric power transmission device.

An electric power transmission device of a contactless electric power transmission system often includes an inverter that is driven under pulse width modulation (PWM) control so as to adjust the frequency and voltage of AC power to be transmitted. In this case, the inverter generally consists of four switching devices Q91-Q94, and four diodes D91-D94 connected in inverse-parallel with the switching devices Q91-Q94, respectively, as shown in FIG. 8. The switching devices Q91-Q94 are grouped into two pairs, each having two devices serving as a source and a sink and located between a positive bus and a negative bus, and opposite terminals of a power transmission coil are connected to respective connecting points of the paired switching devices.

In the electric power transmission device including the inverter as described above, the phase of electric current may lead that of alternating voltage developed under the PWM control. FIG. 9 shows one example of the relationship among the ON/OFF states of the switching devices Q91-Q94 and the output voltage and current of the inverter. In a section labelled as "INVERTER OUTPUT VOLTAGE, CURRENT" in FIG. 9, the solid stepped line represents output voltage, and the solid sine curve represents current at the time when the current phase leads the voltage phase. Considering that the switching device Q91 is now shifting from the OFF state to the ON state, the inverter output voltage is equal to zero, but the current, whose phase leads the voltage phase, assumes a positive value, at time T1 when the switching device Q91 is in the OFF state. At this time, the current flows from a lower power line on the power transmission coil side, to the switching device Q94 that is in the ON state, the switching device Q93 that is in the ON state and diode D93, and an upper power line on the power transmission coil side, in the order of description, as shown in FIG. 10A. At time T2 immediately after the switching device Q91 is turned on, the inverter output voltage assumes a positive value, and the current is kept being a positive value. At this time, the current flows from the positive bus (upper bus) to the upper power line on the power transmission coil side via the switching device Q91 that is in the ON state, and flows from the lower power line on the power transmission coil side to the negative bus (lower bus) via the switching device Q94 that is in the ON state, as shown in FIG. 10B. A forward bias is applied to the diode D93 at time T1 when the switching device Q91 is in the OFF state, and a reverse bias is applied to the diode D93 at time T2 immediately after the switching device Q91 is turned on. Therefore, recovery current flows through the diode D93 as indicated by the thick arrow in FIG. 10B, due to a recovery characteristic of the diode. Since the recovery current results in short-circuit current, it may cause abnormal heating or failure of the electric power transmission device.

SUMMARY OF THE INVENTION

This invention provides an electric power transmission device in which recovery current is prevented from flowing through a diode, so that the electric power transmission device is less likely or unlikely to suffer from abnormal heating or failure.

An electric power transmission device related to the present invention contactlessly transmits electric power to an electric power receiving device including a power receiving unit. The electric power transmission device includes: an inverter having a plurality of switching devices and a plurality of diodes, the inverter being configured to convert DC power derived from an external power supply, into AC power; a power transmission unit configured to transmit the AC power from the inverter, to the power receiving unit of the electric power receiving device; and an electronic control unit configured to control the AC power through switching control of the plurality of switching devices of the inverter, the electronic control unit being configured to determine whether a current phase of output current flowing from the inverter to the power transmission unit leads output voltage, and adjust a frequency of the AC power in a direction to reduce a lead angle of the current phase when leading of the current phase relative to the output voltage is detected.

In the electric power transmission device as described above, when it is determined that the phase of current from the inverter to the power transmission unit leads the output voltage, the frequency of the AC power from the inverter is adjusted in such a direction as to reduce the angle of lead of the current phase. The adjustment is performed once or two or more times, so that leading of the current phase relative to the output voltage is eliminated. If the current phase leads the output voltage, recovery current (short-circuit current) flows through a diode at the time when a given switching device is turned on, and the short-circuit current may cause abnormal heating or failure of the electric power transmission device. If leading of the current phase relative to the output voltage is eliminated, the recovery current (short-circuit current) is prevented from flowing through the diode at the time when the switching device is turned on. Consequently, abnormal heating or failure of the electric power transmission device due to the recovery current (short-circuit current) can be curbed or prevented.

The electronic control unit may be configured to adjust the frequency of the AC power so as to eliminate leading of the current phase.

The electronic control unit may have a map that defines a relationship among a coupling coefficient of the power receiving unit and the power transmission unit, the frequency of the AC power, and the current phase relative to a phase of the voltage of the output voltage. The electronic control unit may calculate the coupling coefficient of the power receiving unit and the power transmission unit. The electronic control unit may be configured to adjust the frequency of the AC power in the direction to reduce the lead angle of the current phase, using a calculated coupling coefficient and the map. The frequency and phase characteristics of the current of the AC power vary depending on the coupling coefficient. The above-indicated map can be prepared as a three-dimensional map, by sequentially changing the coupling coefficient by experiment, or the like, and obtaining the relationship between the coupling coefficient, and the frequency and current phase. Thus, since the frequency is adjusted using the coupling coefficient and the map, leading of the current phase can be more appropriately eliminated.

The electronic control unit may be configured to obtain an amount of adjustment of the frequency from the calculated coupling coefficient and the map, and adjust the frequency of the AC power.

The electronic control unit may be configured to calculate the coupling coefficient based on an output impedance of the inverter. The output impedance of the inverter can be regarded as a function of the coupling coefficient. Therefore, the electronic control unit can calculate the coupling coefficient based on the output impedance of the inverter.

The electronic control unit may be configured to calculate the coupling coefficient by regarding the output impedance as a function of a first self-inductance, a second self-inductance, a first impedance, and the coupling coefficient. The first self-inductance is a self-inductance of the power transmission unit. The second self-inductance is a self-inductance of the power receiving unit. The first impedance is an impedance of the electric power receiving device excluding the power receiving unit. Generally, the coupling coefficient can be calculated from received electric power and transmitted electric power. In this method, however, information concerning the received electric power needs to be transmitted to the power transmission device. On the other hand, the output impedance of the inverter can be calculated only based on information in the electric power transmission device. Thus, the electric power transmission device need not communicate with the electric power receiving device.

Further, the electronic control unit may be configured to calculate the coupling coefficient, by treating the second self-inductance and the first impedance as constants. In the case where the electric power receiving device is standardized, and the self-inductance of the power receiving unit and the impedance of the electric power receiving device excluding the power receiving unit do not substantially change, the self-inductance and the impedance can be treated as constants. Here, the impedance of the electric power receiving device excluding the power receiving unit means the impedance of a portion of the power receiving device located behind the power receiving unit.

The electronic control unit may obtain the second self-inductance and the first impedance from the electric power receiving device and calculates the coupling coefficient, or obtain a ratio of the second self-inductance and the first impedance from the electric power receiving device and calculate the coupling coefficient. In this manner, even in the case where the electric power receiving device is not standardized, the output impedance can be more accurately calculated, and the coupling coefficient can be more accurately calculated. The ratio between the self-inductance of the power receiving unit and the impedance of the electric power receiving device excluding the power receiving unit may also be obtained, since the output impedance is proportional to the self-inductance of the power receiving unit, and is inversely proportional to the impedance of the electric power receiving device excluding the power receiving unit.

The electronic control unit may be configured to detect leading of the current phase, based on a current value obtained at a time when any of the plurality of switching devices is turned on or off. The electronic control unit may be configured to detect leading of the current phase, based on a voltage of the AC power obtained at a time when a sign of the current from the inverter to the power transmission unit changes.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is an explanatory view showing one example of changes in the ON/OFF states of switching devices Q91-

Figure 10A:
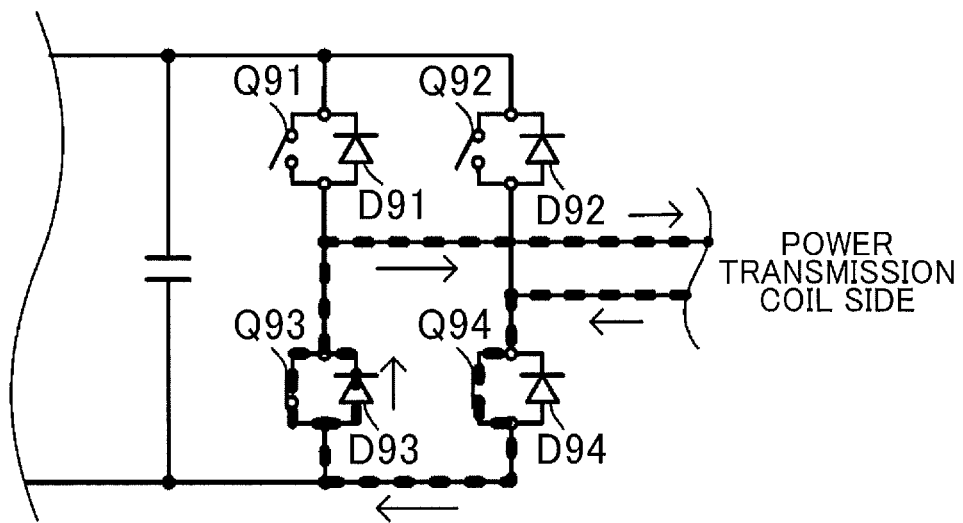
Figure 10B:
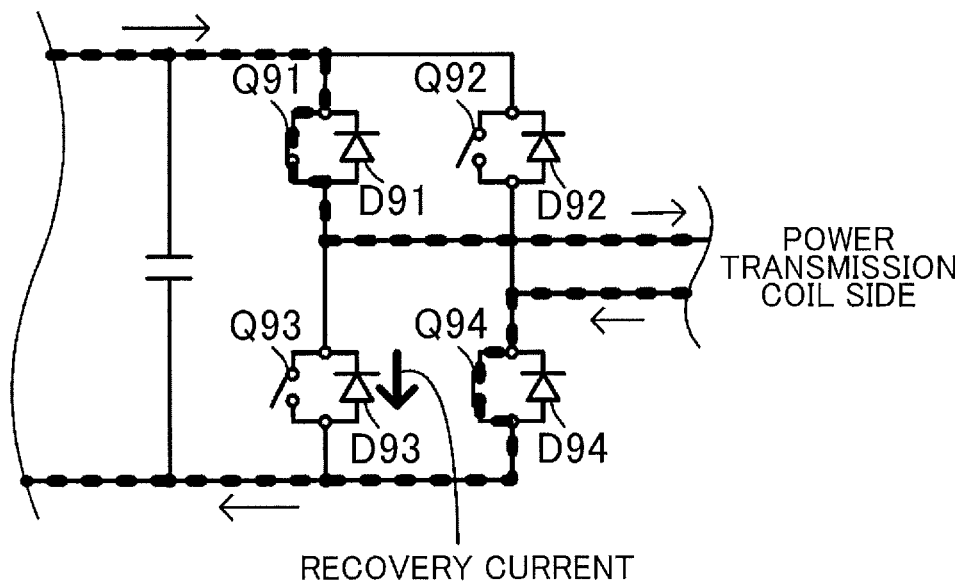

Q94 of the inverter as the known example and the output voltage and current of the inverter with respect to time;

FIG. 10A is an explanatory view showing current flowing in the inverter at time T1 in FIG. 9; and FIG. 10B is an explanatory view showing current flowing in the inverter at time T2 in FIG. 9.

DETAILED DESCRIPTION OF EMBODIMENTS

Next, one embodiment of the invention will be described.

Figure 1:
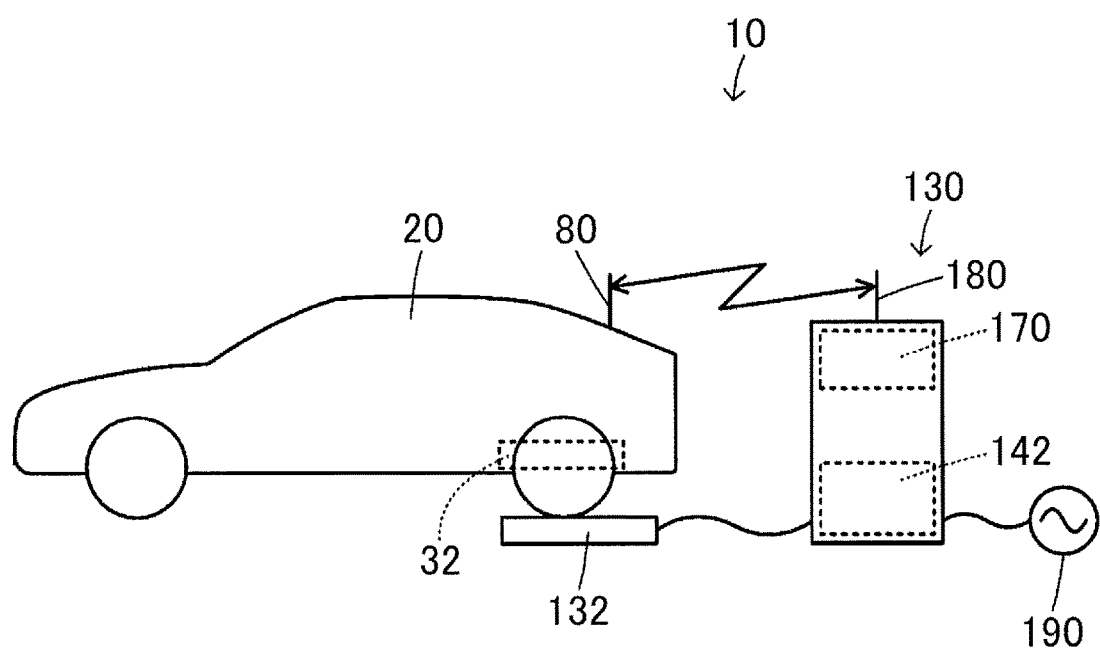
FIG. 1 is a view schematically showing the configuration of a contactless electric power transmitting and receiving system 10 including an electric power transmission device 130 as one embodiment of the invention.
Figure 2:
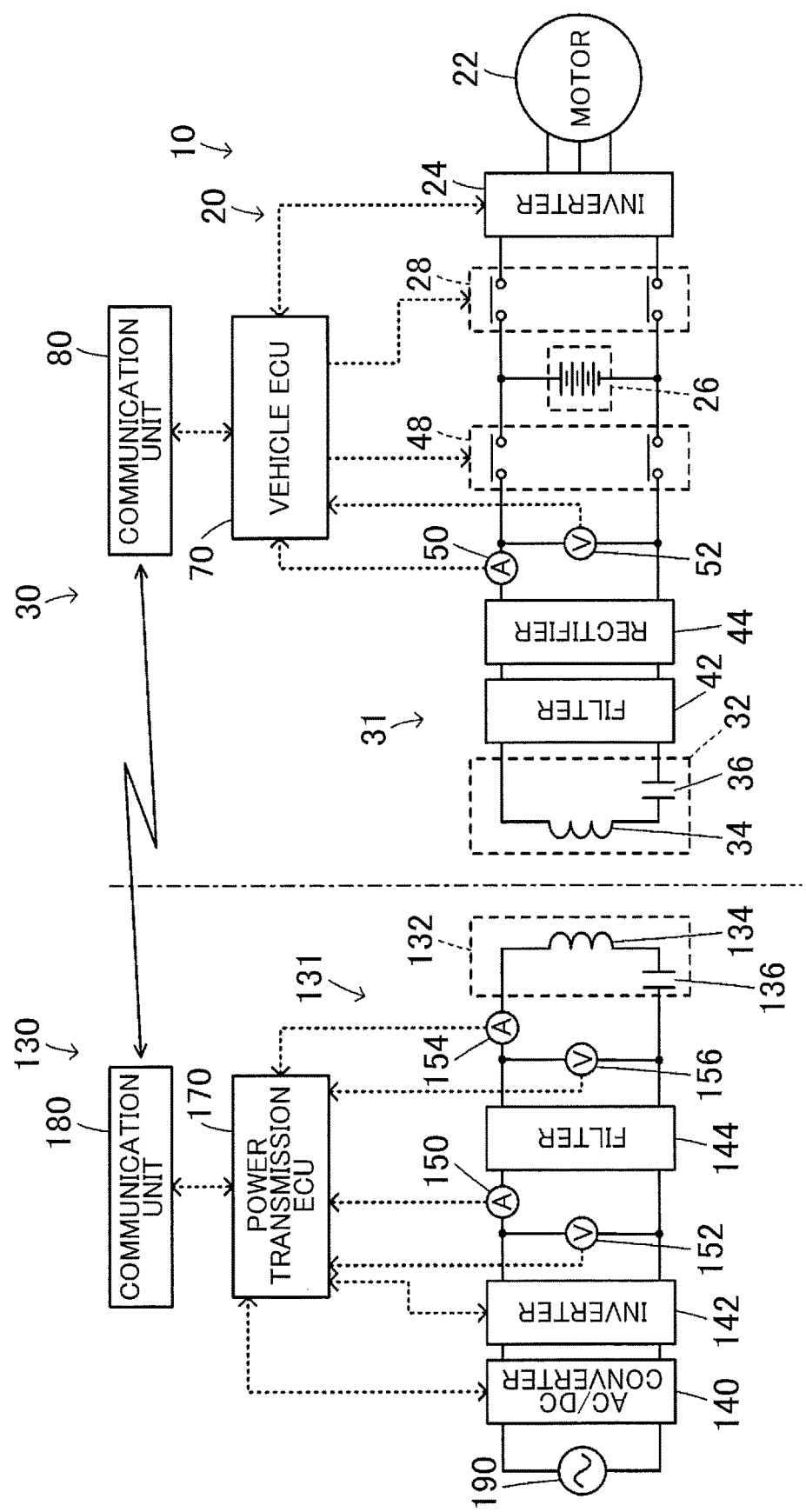
FIG. 2 is a view schematically showing the configuration of the contactless electric power transmitting and receiving system 10 including the electric power transmission device 130 of the embodiment of FIG. 1.

FIG. 1 and FIG. 2 schematically show the configuration of a contactless electric power transmitting and receiving system 10 including an electric power transmission device 130 as one embodiment of the invention. As shown in FIG. 1 and FIG. 2, the contactless electric power transmitting and receiving system 10 of this embodiment includes the electric power transmission device 130 installed in a parking space, or the like, and an automobile 20 on which an electric power receiving device 30 is installed. The electric power receiving device 30 is capable of contactlessly or wirelessly receiving electric power from the electric power transmission device 130.

The electric power transmission device 130 includes a power transmission unit 131 connected to an AC power supply 190, such as a household power supply (of 200V, 50 Hz, for example), and an electronic control unit for power transmission (which will be called "power transmission ECU") 170 that controls the power transmission unit 131. Also, the electric power transmission device 130 includes a communication unit 180 that communicates with the power transmission ECU 170, and also conducts wireless communications with a communication unit 80 (which will be described later) of the automobile 20.

Figure 3:
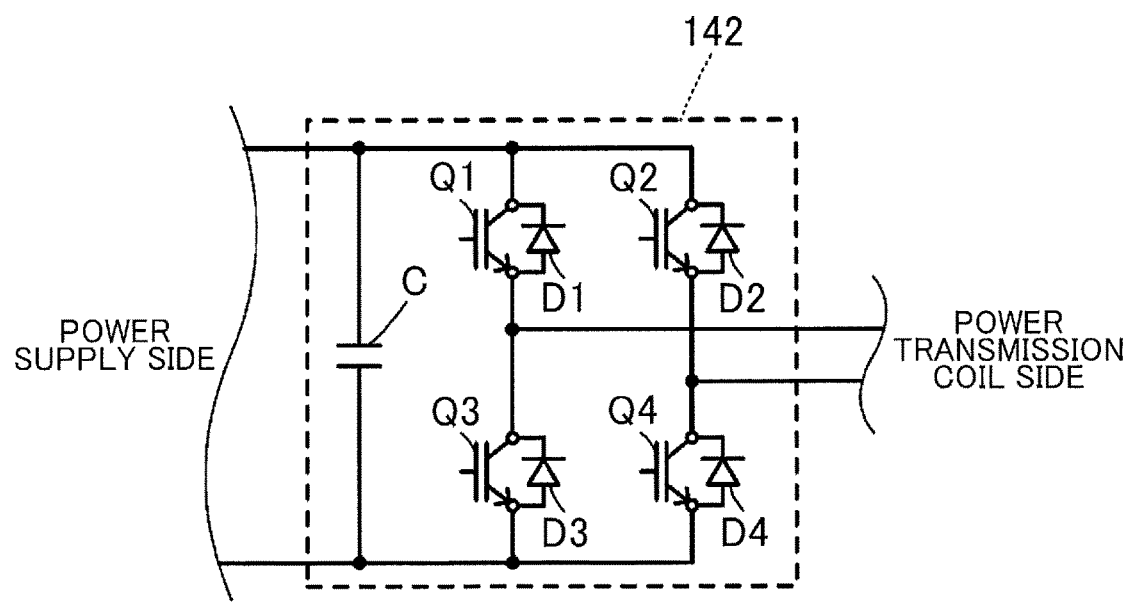
FIG. 3 is a view showing one example of the configuration of an inverter 142.

The power transmission unit 131 includes an AC/DC converter 140, an inverter 142, a filter 144, and a resonance circuit 132 for power transmission. The AC/DC converter 140 is configured as a known AC/DC converter that converts AC power from the AC power supply 190 into DC power having any given voltage. As illustrated by way of example in FIG. 3, the inverter 142 consists of four switching devices Q1-Q4, four diodes D1-D4 connected in inverse-parallel with the switching devices Q1-Q4, respectively, and a smoothing capacitor C. For example, MOSFET (metal-oxide-semiconductor field-effect transistor as one type of field-effect transistor) may be used as each of the four switching devices Q1-Q4. The switching devices Q1-Q4 are grouped into two pairs, each having two devices serving as a source and a sink and located between a positive bus and a negative bus, and opposite terminals of a power transmission coil are connected to respective connecting points of the paired switching devices. The inverter 142 converts DC power from the AC/DC converter 140 to AC power having a desired frequency, through PWM (pulse width modulation) control for controlling switching of the switching devices Q1-Q4. The filter 144 is configured as a known filter for removing high-frequency noise, using a capacitor and an inductor, and serves to remove high-frequency noise of AC power from the inverter 142.

The resonance circuit 132 for power transmission has a power transmission coil 134 installed on a floor of a parking space, for example, and a capacitor 136 connected in series with the power transmission coil 134. The resonance circuit 132 for power transmission is designed such that the resonance frequency is set to a predetermined frequency Fset (around several dozens to several hundreds of kHz). Accordingly, the inverter 142 basically converts DC power received from the AC/DC converter 140, into AC power having the predetermined frequency Fset.

Although not illustrated in the drawings, the power transmission ECU 170 is configured as a microprocessor having CPU as a central component, and includes ROM that stores processing programs, RAM that temporarily stores data, input/output ports, and communication ports, in addition to the CPU. The power transmission ECU 170 receives currents and voltages as described below, via input ports. The currents and voltages include output current Is, voltage Vs, current Itr of the resonance circuit 132 for power transmission, and power transmission voltage Vtr. The output current Is is transmitted from a current sensor 150 that detects current (output current) Is of the AC power into which the DC power was converted by the inverter 142. The voltage Vs is transmitted from a voltage detection unit 152 that converts the AC voltage from the inverter 142 into DC voltage, and detects the DC voltage. The current Itr is transmitted from a current sensor 154 that detects AC current flowing through the resonance circuit 132 for power transmission. The power transmission voltage Vtr is a voltage between the terminals of the resonance circuit 132 for power transmission, and is transmitted from a voltage detection unit 156 that converts AC voltage between the terminals of the power-transmission resonance circuit 132 into DC voltage, and detects the DC voltage. Each of the voltage detection units 152, 156 has a rectifier circuit and a voltage sensor. In the meantime, a control signal to the AC/DC converter 140, a control signal to the inverter 142, etc. are generated via output ports from the power transmission ECU 170.

The automobile 20 is configured as an electric vehicle, and includes a motor 22 for running the vehicle, an inverter 24 for driving the motor 22, and a battery 26 that supplies and receives electric power to and from the motor 22 via the inverter 24. A system main relay 28 is provided between the inverter 24 and the battery 26. Also, the automobile 20 includes a power receiving unit 31 connected to the battery 26, an electronic control unit for vehicle (which will be called "vehicle ECU") 70 that controls the vehicle as a whole, and a communication unit 80 that communicates with the vehicle ECU 70, and also conducts wireless communications with the communication unit 180 of the electric power transmission device 130.

The power receiving unit 31 includes a resonance circuit 32 for power reception, a filter 42, and a rectifier 44. The resonance circuit 32 for power reception has a power receiving coil 34 installed on a bottom (floor panel) of a vehicle body, for example, and a capacitor 36 connected in series with the power receiving coil 34. The resonance circuit 32 for power reception is designed such that the resonance frequency is set to a frequency (ideally, the predetermined frequency Fset) in the vicinity of the above-indicated predetermined frequency Fset (the resonance frequency of the resonance circuit 132 for power transmission). The filter 42 is configured as a known single-stage or two-stage filter for removing high-frequency noise, using a capacitor(s) and an inductor(s), and serves to remove high-frequency noise of AC power received by the resonance circuit 32 for power reception. The rectifier 44 is configured as a known rectifier circuit using four diodes, for example, and converts AC power received by the power-reception resonance circuit 32, from which high-frequency noise has been removed by the filter 42, into DC power. The power receiving unit 31 can be disconnected from the battery 26 by use of a relay 48.

Although not illustrated in the drawings, the vehicle ECU 70 is configured as a microprocessor having CPU as a central component, and includes ROM that stores processing programs, RAM that temporarily stores data, input/output ports, and communication ports. The vehicle ECU 70 receives data needed for drive control of the motor 22 via an input port. Also, the vehicle ECU 70 receives power reception current Ire from a current sensor 50 that detects current (power reception current) Ire of the DC power delivered from the rectifier 44, power reception voltage Vre from a voltage sensor 52 that detects voltage (power reception voltage) Vre of the DC power, etc. via input ports. From the vehicle ECU 70, control signals for controlling switching of switching devices (not shown) of the inverter 24 so as to drive the motor 22, ON/OFF signal to a system main relay 28, etc., are generated via output ports. The vehicle ECU 70 calculates the power storage ratio SOC of the battery 26, based on battery current Ib detected by a current sensor (not shown) mounted in the battery 26, and battery voltage Vb detected by a voltage sensor (not shown) mounted in the battery 26.

Figure 4:
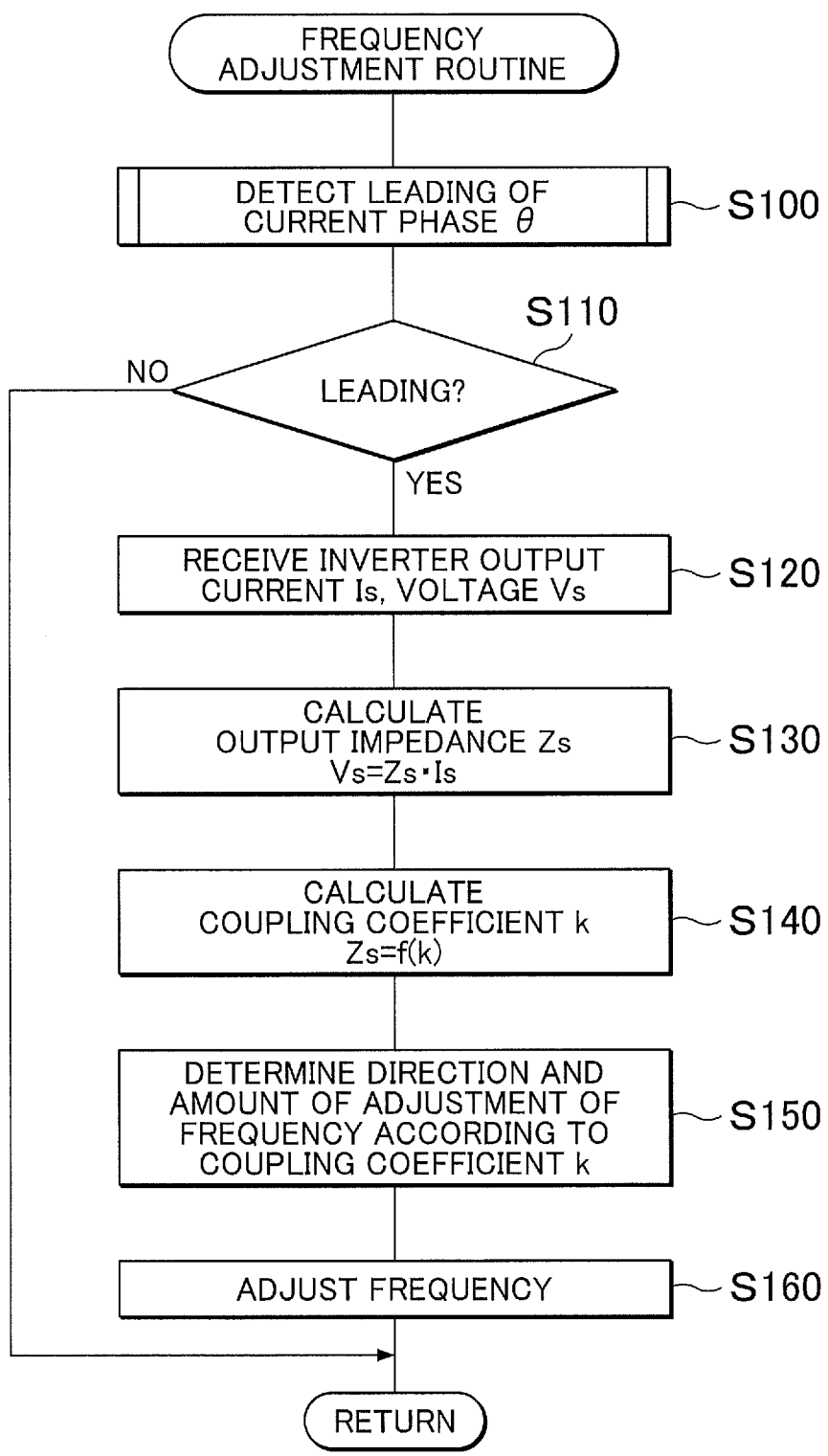
FIG. 4 is a flowchart illustrating one example of a frequency adjustment routine executed by a power transmission ECU 170.

Next, the operation of the electric power transmission device 130 in the contactless electric power transmitting and receiving system 10 configured as described above, in particular, the operation performed when the frequency of the inverter 142 is adjusted, will be described. FIG. 4 is a flowchart illustrating one example of a frequency adjustment routine executed by the power transmission ECU 170. The routine of FIG 4 is repeatedly executed at given time intervals (e.g., at intervals of several hundreds of milliseconds). The frequency of the AC power from the inverter 142 is set to the predetermined frequency Fset that provides the resonance frequency, as the initial value, and switching of the switching devices Q1-Q4 is controlled so that the AC power of the predetermined frequency Fset is delivered from the inverter 142.

Figure 5:
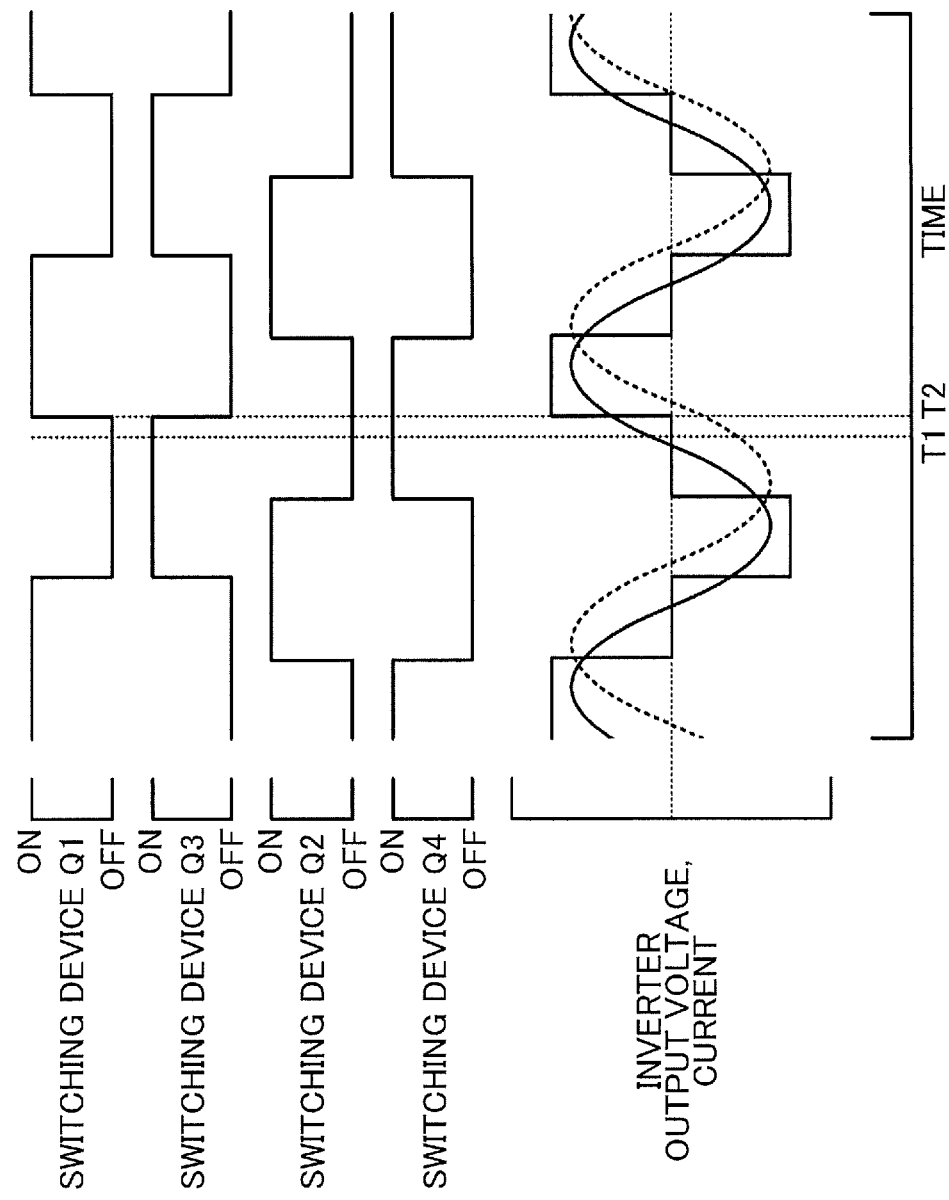
FIG. 5 is an explanatory view showing one example of changes in the ON/OFF states of switching devices Q1-Q4 of the inverter 142 and output voltage and output current of the inverter 142 with respect to time.

Once the frequency adjustment routine is executed, the power transmission ECU 170 initially determines whether the phase (current phase) θ of the output current Is from the inverter 142 leads the output voltage (step S100). Whether the current phase θ leads the output voltage or not may be determined, based on the output current Is of the inverter 142 measured at the time when the switching device Q1 is turned on, for example. FIG. 5 shows one example of changes in the ON/OFF states of the switching devices Q1-Q4 of the inverter 142, and the output voltage and output current of the inverter 142, with respect to time. In a section labelled as "INVERTER OUTPUT VOLTAGE, CURRENT" in FIG. 5, the solid, stepped line represents output voltage, and the solid sine curve represents current obtained when the current phase θ leads the output voltage, while the dotted sine curve represents current obtained when the current phase θ lags behind the output voltage. As shown in FIG. 5, at time T2 at which the switching device Q1 is turned on, the output current Is assumes a positive value when the current phase θ leads the output voltage, and the output current Is assumes a negative value when the current phase θ lags behind the output voltage. Accordingly, it can be determined that the current phase θ leads the output voltage when the output current Is of the inverter 142 is a positive value at the time when the switching device Q1 is turned on. As is understood from FIG, 5, it may also be determined that the current phase θ leads the output voltage, when the output value Is of the inverter 142 is a negative value at the time when the switching device Q1 is turned off. Also, since the ON/OFF state of the switching device Q3 is inverted relative to that of the switching device Q1, it may also be determined whether the current phase θ leads the output voltage, at the time when the switching device Q3 is turned off or the switching device Q3 is turned on. Further, it may be determined whether the current phase θ leads the output voltage, by determining whether the output voltage is equal to zero when the sign of the output current Is changes (changes from positive to negative or from negative to positive). It may also be determined whether the current phase θ leads the output voltage, based on a value of the power factor and the heat generating state of the diode D3.

In the following, the reason why the phase θ of the output current from the inverter 142 leads or lags behind the output voltage will be described. The power-transmission resonance circuit 132 of the electric power transmission device 130 is designed such that the resonance frequency is set to the predetermined frequency Fset, and the power-reception resonance circuit 32 of the electric power receiving device 30 installed on the automobile 20 is also designed such that the resonance frequency is set to the predetermined frequency Fset. Therefore, if there is no error in manufacture of components, and the power-transmission resonance circuit 132 and the power-reception resonance circuit 32 are accurately located at positions as designed, during power transmission and reception, the current phase θ does not lead nor lag behind the output voltage. However, there are errors in manufacture of components of the power-transmission resonance circuit 132 and the power-reception resonance circuit 32, and the frequency and phase characteristics vary among individuals. Therefore, the phase θ of the output current Is leads or lags behind the output voltage. Also, the positions of the power-transmission resonance circuit 132 and the power-reception resonance circuit 32 during power transmission and reception are determined by the location at which the automobile 20 is parked, and thus often fail to coincide with the positions as designed. If the power-transmission resonance circuit 132 and the power-reception resonance circuit 32 are displaced during power transmission and reception, the coupling coefficient k and the inductance change, and the frequency and phase characteristics change. Therefore, the phase θ of the output current Is may lead or lag behind the output voltage. Further, when the DC power received by the inverter 142 is converted into AC power through the pulse width modulation control, the timing of rise of the output voltage changes according to change of the duty ratio; therefore, the current phase θ may lead the output voltage even though there is no change in the current waveform.

When the phase θ of the output current from the inverter 142 leads the output voltage, recovery current may flow through the diode D3 that constitutes the inverter 142, and result in short-circuit current, which may cause abnormal heating or failure of the electric power transmission device 130.

If it cannot be determined in step S100 that the current phase θ leads the output voltage, it is determined that there is no need to adjust the frequency (step S110), and this routine ends. On the other hand, when it is determined that the current phase θ leads the output voltage, frequency adjustment is performed in the following manner.

Initially, the power transmission ECU 170 receives the output current Is of the inverter 142 from the current sensor 150, and receives the voltage Vs from the voltage detection unit 152 (step S120). Then, the ECU 170 calculates the output impedance Zs from the inverter 142, based on the output current Is and the output voltage Vs (step S130). Here, an effective value is used as the output current Is for use in calculation of the impedance Zs. Then, the coupling coefficient k is obtained based on the output impedance Zs (step S140). The output impedance Zs can be expressed as a function of the coupling coefficient k, as indicated in Eq. (1) below. In Eq. (1), "ω" is the angular frequency, "L1" is the self-inductance of the power transmission coil 134, "L2" is the self-inductance of the power receiving coil 34, and "RL" is the impedance behind (on the filter 42 side of) the power-reception resonance circuit 32, namely, the impedance of the electric power receiving device 30 excluding the power-reception resonance circuit 32. Here, the self-inductance L2 of the power receiving coil 34 and the impedance RL behind (on the filter 42 side of) the power-reception resonance circuit 32 may be treated as constants. While the specifications of the electric power receiving device 30 may be varied since the electric power receiving device 30 is installed on the automobile 20, the electric power receiving device 30 needs to be configured according to predetermined standards so as to keep the efficiency of power transmission and receiving at a high level. Thus, if the electric power receiving device 30 is considered to be standardized, the self-inductance L2 and the impedance RL can be treated as constants. In the contactless electric power transmitting and receiving system 10 of this embodiment, the electric power receiving device 30 and the electric power transmission device 130 communicate with each other via the communication unit 80 and the communication unit 180; therefore, the electric power transmission device 130 may obtain, by communication, the self-inductance L2 and the impedance RL (or the ratio (L2/RL) of the self-inductance L2 and the impedance RL), from the automobile 20.

$$Zs = f(k) \approx \frac{\omega^2 k^2 L1 L2}{RL} \quad (1)$$

Figure 6:
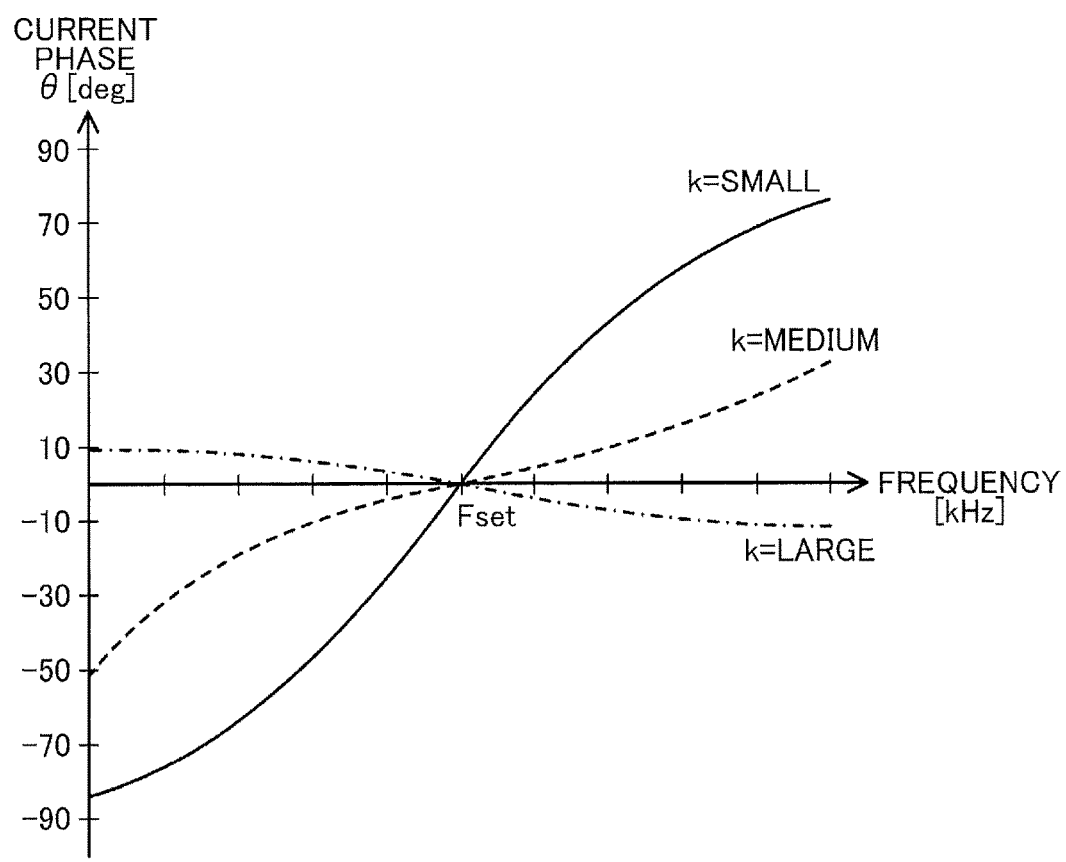
FIG. 6 is an explanatory view showing one example of a map for use in frequency adjustment.

Once the coupling coefficient k is obtained, the direction and amount of adjustment of the frequency are determined based on the coupling coefficient k (step S150). The direction of adjustment of the frequency is a direction in which the lead angle of the current phase θ relative to the output voltage is reduced, namely, a direction in which the current phase θ is lagged or delayed. In this embodiment, the relationship among the coupling coefficient k, the frequency, and the current phase θ is investigated in advance by experiment, or the like, and is stored as a map for use in frequency adjustment. If the coupling coefficient k is given, the direction and amount of adjustment of the frequency are derived from the map and thus determined. One example of the map for frequency adjustment is shown in FIG. 6. In FIG. 6, the current phase θ lags behind the output voltage when it assumes a positive value, and the current phase θ leads the output voltage when it assumes a negative value. As shown in FIG. 6, when the coupling coefficient k is large, the current phase θ lags as the frequency of the output voltage of the inverter 142 is reduced, and the current phase θ leads the output voltage as the frequency is increased. When the coupling coefficient k is large, the lead amount and lag amount of the current phase θ are small even if the amount of adjustment of the frequency is relatively large. On the other hand, when the coupling coefficient k is small, the current phase θ leads the output voltage as the frequency of the output voltage of the inverter 142 is reduced, and the current phase θ lags as the frequency is increased. When the coupling coefficient k is small, the lead amount and lag amount of the current phase θ are large even if the amount of adjustment of the frequency is small. In step S150, since the relationship between the frequency and the current phase θ is determined from the coupling coefficient k, the direction of adjustment of the frequency can be determined to be the direction in which the lead angle of the current phase θ relative to the output voltage is reduced, namely, the direction in which the current phase θ is lagged or delayed. Also, the amount of adjustment can be determined so that the lag amount becomes equal to a predetermined lag amount (e.g., 5 degrees or 7 degrees). For example, when "k=small" as indicated in the map of FIG. 6, the direction of adjustment of the frequency is the direction in which the frequency is increased, and the amount of adjustment is a slight amount (e.g., 0.2 kHz or 0.5 kHz). When "k=large" as indicated in the map of FIG. 6, the direction of adjustment of the frequency is the direction in which the frequency is reduced, and the amount of adjustment is a relatively large amount (e.g., 2 kHz or 5 kHz). When "k=medium" as indicated in the map of FIG. 6, the direction of adjustment of the frequency is the direction in which the frequency is increased, and the amount of adjustment is an intermediate amount (e.g., 1 kHz or 1.5 kHz).

Once the direction and amount of adjustment of the frequency are determined, the frequency of the output voltage of the inverter 142 is adjusted using the direction and amount of adjustment of the frequency thus determined (step S160), and the routine of FIG. 4 ends. The frequency of the output voltage of the inverter 142 can be adjusted by changing the cycle of switching control of the switching devices Q1-Q4.

Figure 7A:
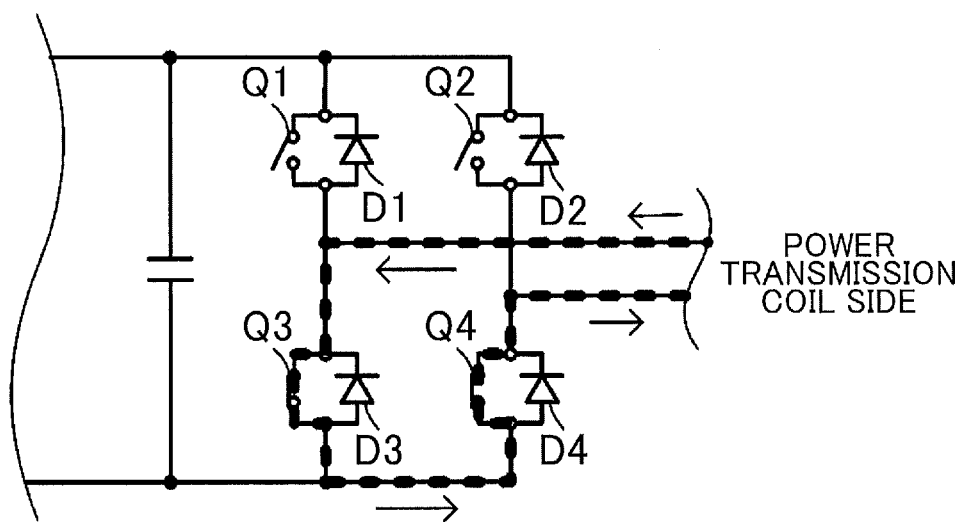
FIG. 7A is an explanatory view showing electric current flowing in the inverter at time T1 in FIG. 5.
Figure 7B:
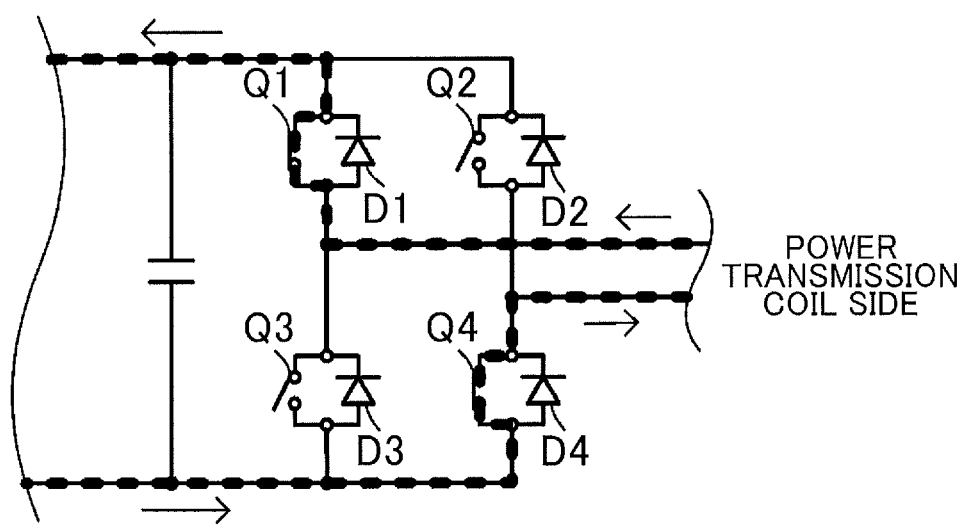
FIG. 7B is an explanatory view showing current flowing in the inverter at time T2 in FIG. 5.
Figure 8:
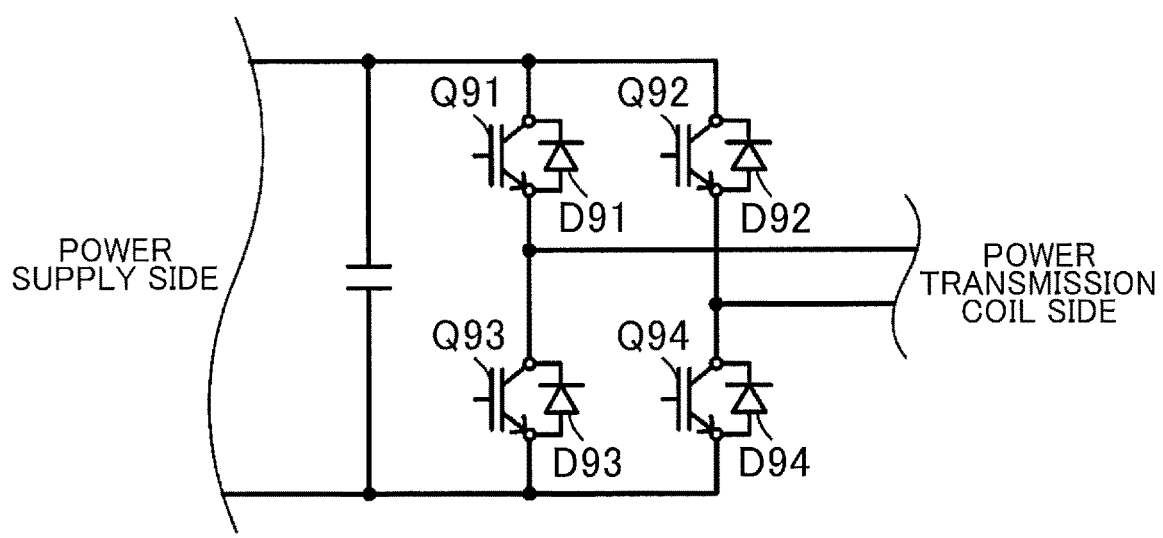
FIG. 8 is a view showing one example of the configuration of an inverter as a known example.

When leading of the phase θ of the output current Is of the inverter 142 relative to the output voltage is not eliminated even though the frequency adjustment routine as described above is performed, the frequency adjustment routine is carried out again, so that leading of the phase θ of the output current Is relative to the output voltage is eliminated. Namely, the current phase θ is lagged or delayed relative to the output voltage. When the current phase θ leads the output voltage (when the current varies along the solid-line sine curve in FIG. 5), the current flows in the manner as described above with reference to FIG. 10A and FIG. 10B. Namely, the current flows as shown in FIG. 10A at time T1 immediately before the switching device Q1 (Q91 in FIG. 10A and FIG. 10B) is turned on, and the current flows as shown in FIG. 10B at time T2 immediately after the switching device Q1 (Q91 in FIG. 10A and FIG. 10B) is turned on. A forward bias is applied to the diode D3 (D93 in FIG. 10A and FIG. 10B) at time T1 immediately before the switching device Q1 is turned on, and a reverse bias is applied to the diode D3 at time T2 immediately after the switching device Q1 is turned on. Therefore, recovery current flows through the diode D3 (D93 in FIG. 10A and FIG. 10B) as indicated by the thick arrow in FIG. 10B, due to a recovery characteristic of the diode. When the current phase θ lags behind the output voltage (when the current varies along the broken-line sine curve in FIG. 5), the current flows in the following manner At time T1 immediately before the switching device Q1 is turned on in FIG. 5, the current flows from the upper power line on the power transmission coil side to the lower power line on the power transmission coil side, via the switching device Q3 that is in the ON state, the switching device Q4 that is in the ON state, and the diode D4, as shown in FIG. 7A. At time T2 immediately after the switching device Q1 is turned on in FIG. 5, the current flows from the upper power line on the power transmission coil side to the positive bus on the power supply side, via the switching device Q1 that is in the ON state, and also flows from the negative bus on the power supply side to the lower power line on the power transmission coil side, via the switching device Q4 that is in the ON state and the diode D4, as shown in FIG. 7B. Since a reverse bias is applied to the diode D3, at time T1 immediately before the switching device Q1 is turned on and time T2 immediately after the switching device Q1 is turned on, no recovery current flows. Accordingly, when the current phase θ leads the output voltage, leading of the current phase θ relative to the output voltage is eliminated through execution of the frequency adjustment routine, so that no recovery current flows through the diode D3. As described above, the recovery current that flows through the diode D3 at the time when the switching device Q1 is turned on results in short-circuit current; therefore, it is possible to prevent short-circuit current from flowing, by performing the frequency adjustment routine.

In the electric power transmission device 130 of the contactless electric power transmitting and receiving system 10 of the embodiment as described above, when it is determined that the phase θ of the output current Is of the inverter 142 leads the output voltage, the output impedance Zs of the inverter 142 is calculated, and the coupling coefficient k is obtained based on the output impedance Zs. Then, the frequency of the output voltage of the inverter 142 is adjusted in such a direction as to reduce the lead angle of the current phase θ based on the coupling coefficient k. In this manner, leading of the current phase θ is eliminated, so that no recovery current flows through the diode D3 at the time when the switching device Q1 is turned on. Since the recovery current of the diode D3, which would otherwise appear when the switching device Q1 is turned on, results in short-circuit current, it is possible to curb or prevent abnormal heating or failure of the electric power transmission device 130 due to the short-circuit current.

While the frequency is adjusted by a given lag amount or angle as the amount of adjustment of the frequency in the electric power transmission device 130 of the embodiment, the frequency may be adjusted by a given frequency (e.g., 0.5 kHz or 1 kHz) as the amount of adjustment of the frequency. Also, the given frequency as the amount of adjustment may be changed based on the coupling coefficient k, and used. For example, 2 kHz may be used as the amount of adjustment when "k=large" in FIGS. 6, and 0.1 kHz may be used as the amount of adjustment when "k=small" in FIG. 6.

In this embodiment, the electric power transmission device 130 of the contactless electric power transmitting and receiving system 10 having the electric power receiving device 30 installed on the automobile 20 and the electric power transmission device 130 has been described. However, the electric power transmission device according to the invention may be included in a contactless electric power transmitting and receiving system having an electric power receiving device installed on a vehicle or a mobile body other than the automobile, and an electric power transmission device, or may be included in a contactless electric power transmitting and receiving system having an electric power receiving device incorporated in a facility other than the mobile body, and an electric power transmission device.

The electric power receiving device 30 is one example of the above-mentioned "electric power receiving device", the electric power transmission device 130 is one example of "electric power transmission device", the switching devices Q1-Q4 are one example of "a plurality of switching devices", the diodes D1-D4 are one example of "a plurality of diodes", the inverter 142 is one example of "inverter", the resonance circuit 32 for power reception is one example of "power receiving unit", the resonance circuit 132 for power transmission is one example of "power transmission unit", and the power transmission ECU 170 is one example of "electronic control unit".

It is to be understood that the above-described correspondence is one example used for specifically explaining one mode for carrying out the invention, and therefore, does not limit the elements of the invention. Namely, the invention is to be construed based on the description of "SUMMARY OF THE INVENTION" above, and the above-described embodiment is a mere specific example of the invention.

While the invention has been described using the embodiment, it is to be understood that the invention is by no means limited to this embodiment, but may be embodied in various modes or forms, without departing from the principle of the invention.

The present invention can be utilized in the industry of manufacturing of electric power transmission devices of contactless electric power transmitting and receiving systems.

What is claimed is:

1. An electric power transmission device that contactlessly transmits electric power to an electric power receiving device including a power receiving unit, the electric power transmission device comprising:
   an inverter having a plurality of switching devices and a plurality of diodes, the inverter being configured to convert DC power derived from an external power supply, into AC power;
   a power transmission unit configured to transmit the AC power from the inverter, to the power receiving unit of the electric power receiving device; and
   an electronic control unit configured to control the AC power through switching control of the plurality of switching devices of the inverter, the electronic control unit being configured to determine whether a current phase of output current flowing from the inverter to the power transmission unit leads output voltage, and adjust a frequency of the AC power in a direction to reduce a lead angle of the current phase when leading of the current phase relative to the output voltage is detected.

2. The electric power transmission device according to claim 1, wherein
   the electronic control unit is configured to adjust the frequency of the AC power so as to eliminate leading of the current phase.

3. The electric power transmission device according to claim 1, wherein
   the electronic control unit has a map that defines a relationship among a coupling coefficient of the power receiving unit and the power transmission unit, the frequency of the AC power, and the current phase relative to a phase of the voltage of the output voltage,
   the electronic control unit calculates the coupling coefficient of the power receiving unit and the power transmission unit, and
   the electronic control unit is configured to adjust the frequency of the AC power in the direction to reduce the lead angle of the current phase, using a calculated coupling coefficient and the map.

4. The electric power transmission device according to claim 3, wherein
   the electronic control unit is configured to obtain an amount of adjustment of the frequency from the calculated coupling coefficient and the map, and adjust the frequency of the AC power.

5. The electric power transmission device according to claim 3, wherein
the electronic control unit is configured to calculate the coupling coefficient based on an output impedance of the inverter.

6. The electric power transmission device according to claim 5, wherein
the electronic control unit is configured to calculate the coupling coefficient by regarding the output impedance as a function of a first self-inductance, a second self-inductance, a first impedance, and the coupling coefficient,
the first self-inductance being a self-inductance of the power transmission unit, the second self-inductance being a self-inductance of the power receiving unit, the first impedance being an impedance of the electric power receiving device excluding the power receiving unit.

7. The electric power transmission device according to claim 6, wherein
the electronic control unit is configured to calculate the coupling coefficient, by treating the second self-inductance and the first impedance as constants.

8. The electric power transmission device according to claim 7, wherein
the electronic control unit obtains the second self-inductance and the first impedance from the electric power receiving device and calculates the coupling coefficient, or obtains a ratio of the second self-inductance and the first impedance from the electric power receiving device and calculates the coupling coefficient.

9. The electric power transmission device according to claim 1, wherein
the electronic control unit is configured to detect leading of the current phase, based on a current value obtained at a time when any of the plurality of switching devices is turned on or off.

10. The electric power transmission device according to claim 1, wherein
the electronic control unit is configured to detect leading of the current phase, based on a voltage of the AC power obtained at a time when a sign of the current from the inverter to the power transmission unit changes.

* * * * *